(12) United States Patent
Wagner et al.

(10) Patent No.: US 8,739,616 B2
(45) Date of Patent: Jun. 3, 2014

(54) METHOD FOR DIAGNOSING A SENSOR UNIT OF AN INTERNAL COMBUSTION ENGINE

(75) Inventors: Horst Wagner, Niederstozingen (DE); Slobodanka Lux, Deizisau (DE); Martin Hoerner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 343 days.

(21) Appl. No.: 12/820,700

(22) Filed: Jun. 22, 2010

(65) Prior Publication Data
US 2011/0000288 A1    Jan. 6, 2011

(30) Foreign Application Priority Data

Jul. 1, 2009 (DE) .......................... 10 2009 027 400

(51) Int. Cl.
*G01M 15/02* (2006.01)
(52) U.S. Cl.
USPC ..................................................... 73/114.77
(58) Field of Classification Search
USPC ............... 73/114.32, 114.37, 114.69, 114.76, 73/114.77
See application file for complete search history.

(56) References Cited

U.S. PATENT DOCUMENTS

| | | | | |
|---|---|---|---|---|
| 5,190,012 A | * | 3/1993 | Takahashi | 123/479 |
| 5,311,765 A | * | 5/1994 | Iwakiri | 73/35.03 |
| 5,353,636 A | * | 10/1994 | Sakurai et al. | 73/114.11 |
| 2003/0213294 A1 | | 11/2003 | Date | |
| 2005/0159877 A1 | * | 7/2005 | Hattori | 701/114 |
| 2009/0312941 A1 | * | 12/2009 | Wang et al. | 701/114 |

FOREIGN PATENT DOCUMENTS

| | | |
|---|---|---|
| CN | 1641199 | 7/2005 |
| DE | 10 2005 025 884 | 12/2006 |

* cited by examiner

*Primary Examiner* — Eric S McCall
(74) *Attorney, Agent, or Firm* — Kenyon & Kenyon LLP

(57) ABSTRACT

A method for diagnosing a sensor unit of an internal combustion engine, in which an output signal of the sensor unit is compared to a setpoint value which is specified independently from the output signal. The setpoint value relates to a periodic characteristic, and the variation over time of the value of the output signal of the sensor unit or a variable which is derived from the value variation over time is analyzed with regard to this periodic characteristic.

17 Claims, 7 Drawing Sheets

| Amplitude | Phase | Defect | Illustration |
|---|---|---|---|
| ⇕ | ⇕ | - | Fig. 6 |
| 0 | n.a. | D1 | Fig. 7 |
| ⇒ | ⇕ | D2 | Fig. 8 |
| ⇐ | ⇕ | D3 | |
| ⇒ | ⇐ | D4 | Fig. 9 |
| ⇐ | ⇒ | D5 | |
| ⇒ | ⇒ | D6 | |
| ⇕ | ⇒ | | |
| ⇐ | ⇐ | D7 | |
| ⇕ | ⇐ | | |

Fig. 5

METHOD FOR DIAGNOSING A SENSOR UNIT OF AN INTERNAL COMBUSTION ENGINE

RELATED APPLICATION INFORMATION

The present application claims priority to and the benefit of German patent application no. 10 2009 027 400.6, which was filed in Germany on Jul. 1, 2009, the disclosure of which is incorporated herein by reference.

FIELD OF THE INVENTION

The present invention relates to a method for diagnosing a sensor unit of an internal combustion engine, in which an output signal of the sensor unit is compared to a setpoint value which is specified independently from the output signal. Moreover, the exemplary embodiments and/or exemplary methods of the present invention relates to a computer program and a control unit for an internal combustion engine.

BACKGROUND INFORMATION

For the optimal control of an internal combustion engine, a variety of sensor units are necessary which are used to detect, for example, pressures or mass flow rates of combustion air supplied to the internal combustion engine, or of exhaust gas or recirculated exhaust gas. Since the functionality of the sensor unit has a great influence on safe and low-emission operation of the internal combustion engine, it is necessary to be able to diagnose errors of the sensor units so that appropriate responses may be initiated in the event of errors or malfunctions of the sensor units. In principle, it is possible to provide each sensor unit in duplicate, so that an error of one sensor unit may be detected by comparing the signals of both sensor units. However, this is expensive, requires considerable space, and increases the weight of a motor vehicle. In addition, the increase in the number of sensors is accompanied by an increased probability of failure of the overall system.

For the above reasons, attempts have been made to largely dispense with a redundant sensor system and use other methods for error diagnosis. For example, the sensor units may be monitored electrically, thus allowing an unplugged cable or a short circuit to be detected.

It is also possible to check various sensor units for plausibility at given operating points of the internal combustion engine, for example, by comparing the signals of an ambient pressure sensor, a boost pressure sensor, and an exhaust gas back-pressure sensor when the internal combustion engine is at a standstill. This type of error detection may be easily carried out, but has the disadvantage of a time-limited monitoring range.

Plausibility checking of a first sensor is also possible by modeling expected values for the first sensor based on signals of other sensors, and comparing the expected values to the actual value from the first sensor. However, an interaction with calibration functions may occur. In addition, it is not always possible to unambiguously identify a defective sensor of a sensor system.

In the method stated at the outset, an output signal of the sensor unit is compared to a setpoint value which is specified independently from the output signal. This method may also be referred to as a "physical signal range check." The defect in a sensor unit is detected when a measured value is outside of a physically meaningful value range for use in a motor vehicle. This error diagnosis may be easily carried out, but heretofore has been suitable only for detecting limited error patterns.

A method is discussed in german patent document DE 10 2005 025 884 A1 for correcting a signal of a sensor, in which at least one characteristic variable of the sensor signal is compared to a reference value. The sensor signal is corrected as a function of the comparison result. A value for the at least one characteristic variable of the sensor signal which is derived from the sensor signal is formed as the reference value. Thus, the reference value is specified as a function of the output signal of the sensor unit.

SUMMARY OF THE INVENTION

Accordingly, an object of the exemplary embodiments and/or exemplary methods of the present invention is to improve a method of the type stated at the outset in such a way that reliable detection of errors of the sensor unit is enabled with as few limitations as possible.

This object may be achieved according to the present invention using a method of the type stated at the outset, by the fact that the setpoint value relates to a periodic characteristic, and the variation over time of the value of the output signal of the sensor unit or a variable which is derived from the variation of the value over time is analyzed with regard to this periodic characteristic.

Advantageous refinements are described herein. Features which are important for the exemplary embodiments and/or exemplary methods of the present invention are also present in the following description and in the drawing. The features may be important for the exemplary embodiments and/or exemplary methods of the present invention, alone as well as in various combinations, without further reference explicitly being made thereto.

Within the scope of the exemplary embodiments and/or exemplary methods of the present invention it has been recognized that the non-continuous principle of operation of internal combustion engines, which are usually designed as reciprocating engines, has an influence on the output signal of a sensor unit. Thus, periodic characteristics of the output signal of the sensor unit may be analyzed and compared to a setpoint value which relates to the same periodic characteristic. This allows a variety of error patterns to be reliably detected. Thus, for example, it may be identified whether a sensor unit is even functioning at all, for example, due to icing, or because a gain error or gradient error of the sensor unit is present, or whether an offset error of a sensor unit is present, or whether the dynamics of a sensor unit have changed in an impermissible manner.

The method according to the present invention is passive, so that for diagnosis of a sensor unit it is not necessary to influence the operation of the internal combustion engine. A diagnostic option is thus provided which is largely independent of the operating state of the engine.

As the result of the reliable detection of a variety of error patterns, it is also possible to largely dispense with a redundant design of the sensor units.

The periodic characteristic is advantageously an amplitude and/or a phase characteristic of the value curve over time. These periodic characteristics allow a particularly good conclusion to be drawn concerning the functionality of a sensor unit. A variety of error patterns may be detected in particular for a combination of the characteristics amplitude and phase.

It particularly may be the case that the periodic characteristic is based on at least one reference frequency which is a function of an operating state of the internal combustion engine. It is thus taken into account that the vibrations occurring during operation of the internal combustion engine are determined by the design of the internal combustion engine and of the air system. Thus, for the same type of internal combustion engine, the vibrations are characteristic of the particular operating point of the internal combustion engine.

The reference frequency corresponds, for example, to an ignition frequency at which ignition processes of the internal combustion engine are initiated and/or carried out. To achieve independence from the variable rotational speed of the internal combustion engine, in this regard an order analysis ("engine order") may be used, rather than an analysis over fixed time frequencies, which is also possible in principle.

Alternatively or additionally, the reference frequency may correspond to a revolution frequency of a crankshaft or a camshaft of the internal combustion engine. This also allows the variation over time of the value of the output signal of the sensor unit to be evaluated in a particularly simple manner.

The reference frequency is advantageously set in relation to a reference position of a crankshaft or a camshaft of the internal combustion engine. This allows a particularly accurate conclusion to be drawn concerning a phase characteristic of the variation over time of the value of the output signal of the sensor unit or of a derived variable.

The setpoint value, which is specified independently from the output signal of the sensor unit, may correspond to an expected value or a limit value. When the setpoint value corresponds to an expected value, a conclusion is drawn concerning a defect in the sensor unit when there is an impermissibly high deviation of a value of the periodic characteristic of the value variation over time of the sensor unit or of a derived variable. If the setpoint value is a limit value, an error when the value is above or below the limit value may be detected.

The setpoint value is advantageously stored in a control unit of the internal combustion engine.

According to one specific embodiment of the present invention, the setpoint value is specified as a function of an operating state of the internal combustion engine. For this purpose characteristic curves or characteristics maps, for example, may be used, in which the setpoint value is plotted as a function of at least one further parameter of the internal combustion engine.

Within the scope of the exemplary embodiments and/or exemplary methods of the present invention, a sensor unit is understood to be at least a portion of a signal processing chain which extends from the detection of a physical signal to carrying out a monitoring algorithm in a control unit. However, the sensor unit may include at least one pressure sensor or mass flow sensor. Alternatively or additionally, the sensor unit includes at least one evaluation unit for evaluation and/or plausibility checking of a sensor signal. This evaluation unit may be formed by a control unit of the internal combustion engine or a portion thereof, or by a separate unit.

Of particular importance is the implementation of the method according to the present invention in the form of a computer program, which may be stored on an electronic storage medium and which in this form may be assigned to a control unit which controls the internal combustion engine.

Further advantages, features, and particulars of the exemplary embodiments and/or exemplary methods of the present invention result from the following description, in which various exemplary embodiments of the present invention are illustrated with reference to the drawing. The features mentioned in the claims and in the description may each be essential to the present invention, individually or in any given combination.

One specific embodiment of the present invention is explained below with reference to the accompanying drawings.

BRIEF DESCRIPTION OF THE DRAWINGS

FIG. 5 shows a tabular overview of changes in periodic characteristics of the diagnostic signal, and error patterns associated with these changes.

DETAILED DESCRIPTION

Figure 1:
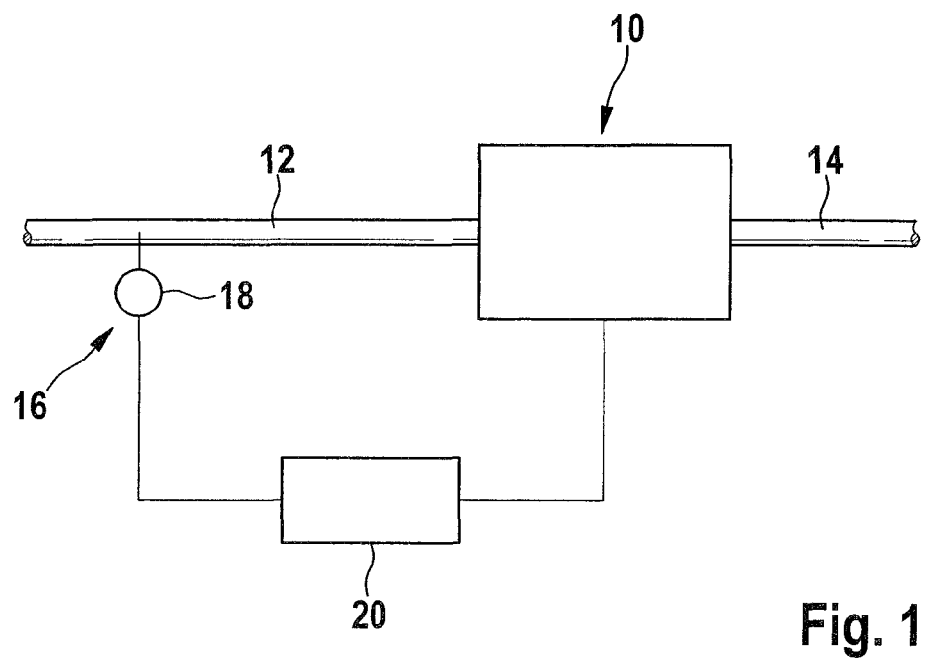
FIG. 1 shows a schematic illustration of an internal combustion engine, a sensor unit, and a control unit.

One specific embodiment of an internal combustion engine is denoted by reference numeral 10 in FIG. 1. Internal combustion engine 10 is designed as a reciprocating internal combustion engine, and has at least one combustion chamber which is supplied with combustion air via a combustion air intake line 12. Exhaust gas generated in the combustion chamber is discharged from the combustion chamber via an exhaust gas discharge line 14.

Internal combustion engine 10 includes a sensor unit 16 which has a sensor 18 for detecting a pressure or a mass flow of combustion air. Sensor 18 communicates with a control unit 20. At the same time, control unit 20 may be configured for actuating an ignition unit and/or a fuel injector of internal combustion engine 10.

For the exemplary embodiment described below, sensor 18 is a pressure sensor, for example, a sensor which detects a boost pressure.

Figure 2:
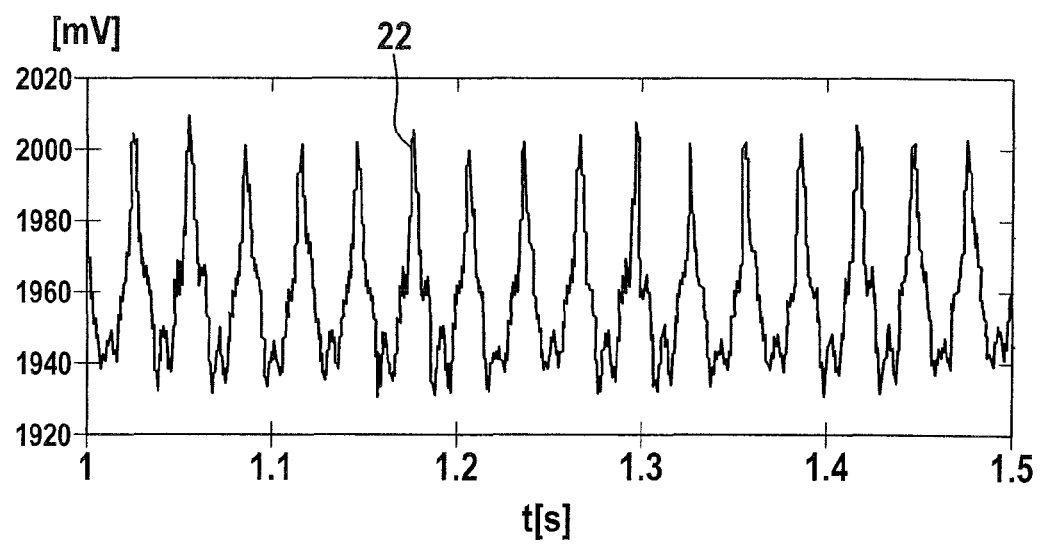
FIG. 2 shows an example of a variation over time of the value of an output signal of the sensor unit according to FIG. 1.

FIG. 2 shows an example of a variation over time 22 of the value of a boost pressure, plotted along a time axis. In the example illustrated in FIG. 2, the output signal is present in the form of a voltage signal.

Figure 3:
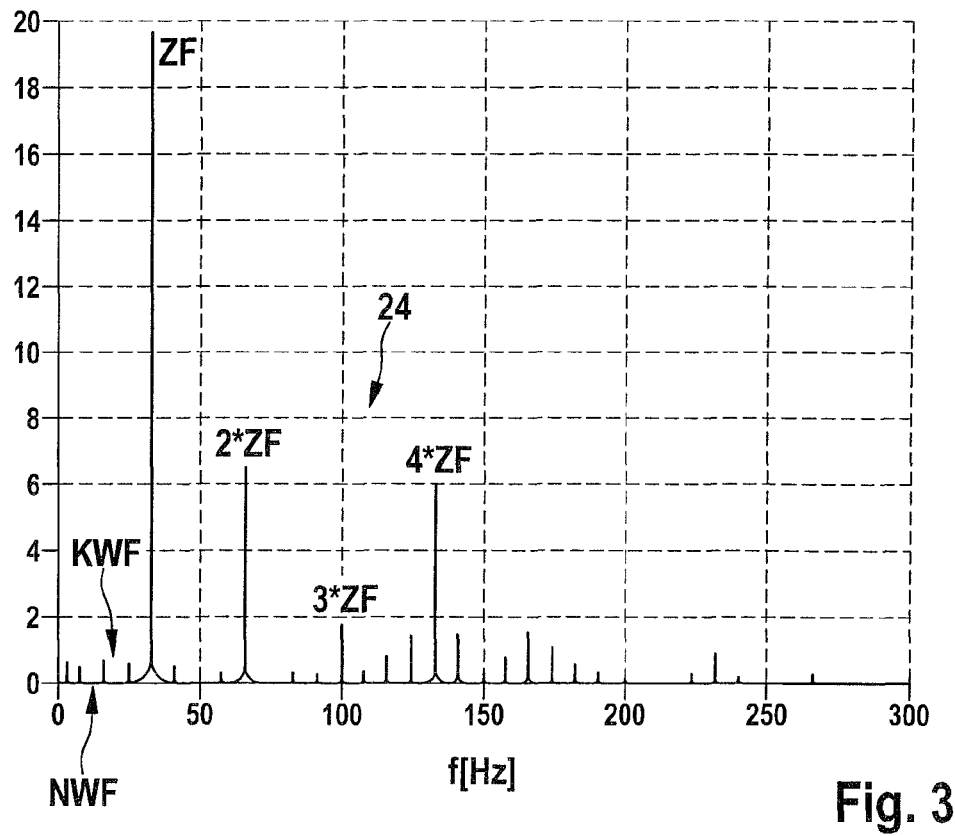
FIG. 3 shows a spectrum of the variation of the value over time according to FIG. 2.

FIG. 3 illustrates a spectrum 24 of value variation over time 22 shown in FIG. 2. The spectrum illustrates that value variation over time 22 has periodic characteristics. For example, value variation over time 22 has sixteen maxima in the half-second period of time illustrated in FIG. 2. This corresponds to a frequency of 32 hertz. In the spectrum according to FIG. 3, a corresponding peak is apparent for the ignition frequency (ZF) at 32 hertz and at multiples of ignition frequency ZF. The same applies for the revolution frequencies of a crankshaft (KWF) and a camshaft (NWF) of internal combustion engine 10.

The amplitude of value variation over time 22 at ignition frequency ZF is therefore particularly well suited for analyzing value variation over time 22. It is also advantageous when a phase of ignition frequency ZF is based on a position of the crankshaft of internal combustion engine 10.

Figure 4:
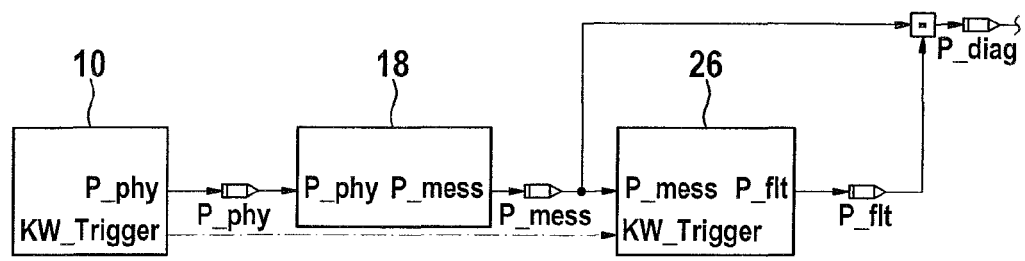
FIG. 4 shows a schematic view of a system for ascertaining a diagnostic signal.

FIG. 4 schematically illustrates a system for ascertaining a diagnostic signal P_diag. P_diag is a variable which is derived from value variation over time 22. The vibration component of value variation over time 22 having ignition frequency ZF may be separated using the system according to FIG. 4.

The system illustrated in FIG. 4 includes a signal filter 26, which may be integrated into control unit 20. Higher-order signal components, in particular ignition frequency ZF, are damped with the aid of signal filter 26.

With the aid of the system illustrated in FIG. 4, an actual pressure value p_phy may be detected by sensor 18, which may generate an output signal P_mess from this pressure value. This output signal is filtered with the aid of signal filter 26, thus generating a filtered signal P_fit. A diagnostic signal P_diag may be determined from the difference in output signal P_mess and filtered signal P_fit by simple subtraction. This diagnostic signal contains in particular the ignition frequency vibration and multiples thereof.

FIG. 5 indicates in a tabular overview the manner in which a change in the amplitude and the phase of diagnostic signal P_diag may be associated with an operational sensor or various error patterns D1 through D7.

Figure 6:
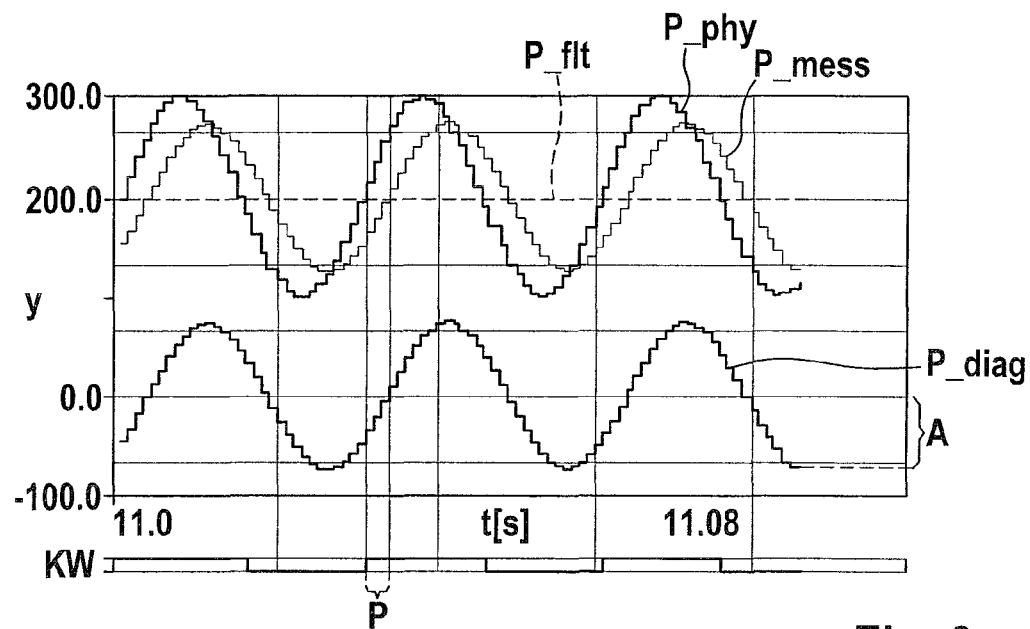
FIG. 6 shows an illustration of various signal curves associated with the sensor unit according to FIG. 1, with the sensor unit in a non-defective state.

In the case of unchanged amplitude A and phase P, an operational sensor 18 is assumed. This state of sensor 18 is illustrated in FIG. 6.

In the referenced figure, measured signal P_mess is represented along a time axis, and specifies value variation over time 22. Also illustrated are a curve P_phy which corresponds to the actual pressure that is present, filtered signal P_fit, and diagnostic signal P_diag.

Diagnostic signal P_diag has an amplitude A of 74 hPa, and a phase P at a crankshaft position KW of 18°. In the fully operational state of sensor 18 illustrated in FIG. 6, amplitude A and phase P correspond to setpoint values stored in control unit 20, which may also be referred to as expected values. This is illustrated in FIG. 5 by the horizontal double arrows. In FIG. 5 a downwardly pointing arrow corresponds to an actual value of amplitude A or of phase P which is less than a setpoint value. Accordingly, an upwardly pointing arrow corresponds to an actual value of amplitude A or of phase P which is greater than a setpoint value.

Figure 7:
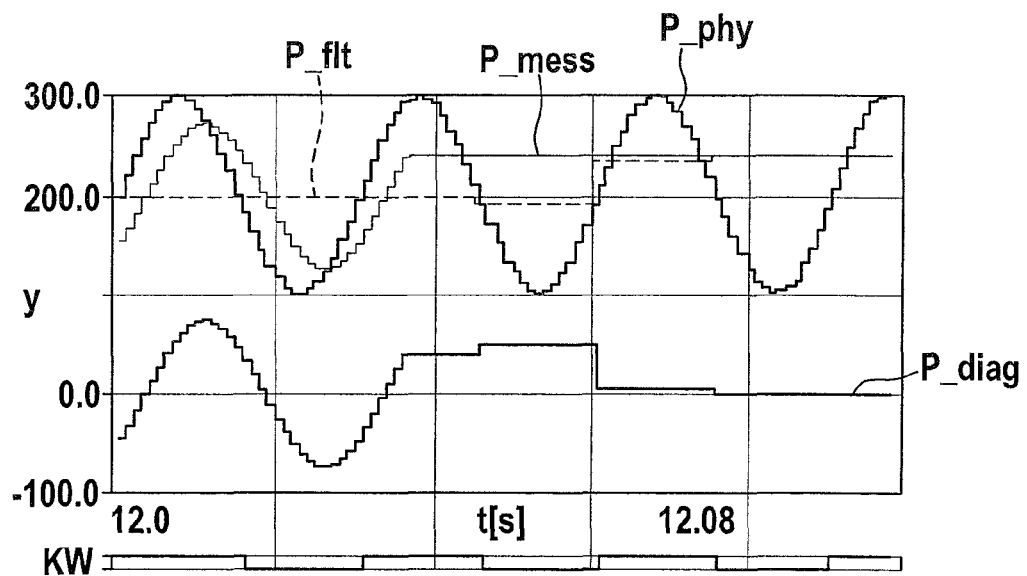
FIG. 7 shows an illustration of various signal curves associated with the sensor unit according to FIG. 1, with the sensor unit in a defective state.

When amplitude A is equal to zero and no information concerning phase P is available (n. a.=not available), an error pattern D1 is present which is illustrated in FIG. 7. As shown, P_mess which is measured by sensor 18 remains at a given level. This causes diagnostic signal P_diag to change in such a way that it has an amplitude of zero, and therefore has an indeterminate phase P. This error pattern may be associated with a "frozen" sensor.

Figure 8:
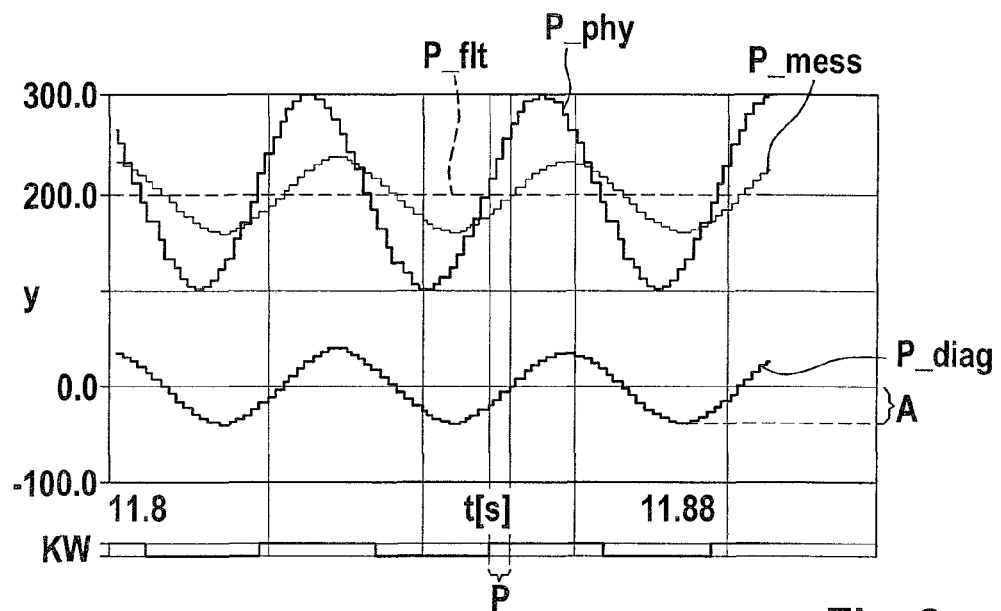
FIG. 8 shows an illustration corresponding to FIG. 7 for a further defective state of the sensor unit.

For error pattern D2 illustrated in FIG. 8, diagnostic signal P_diag has an amplitude A which is less than a setpoint value, and has a phase P which corresponds to the setpoint value (and which is unchanged with respect to phase P illustrated in FIG. 6). This error pattern corresponds to an excessively low gain of sensor 18.

Figure 9:
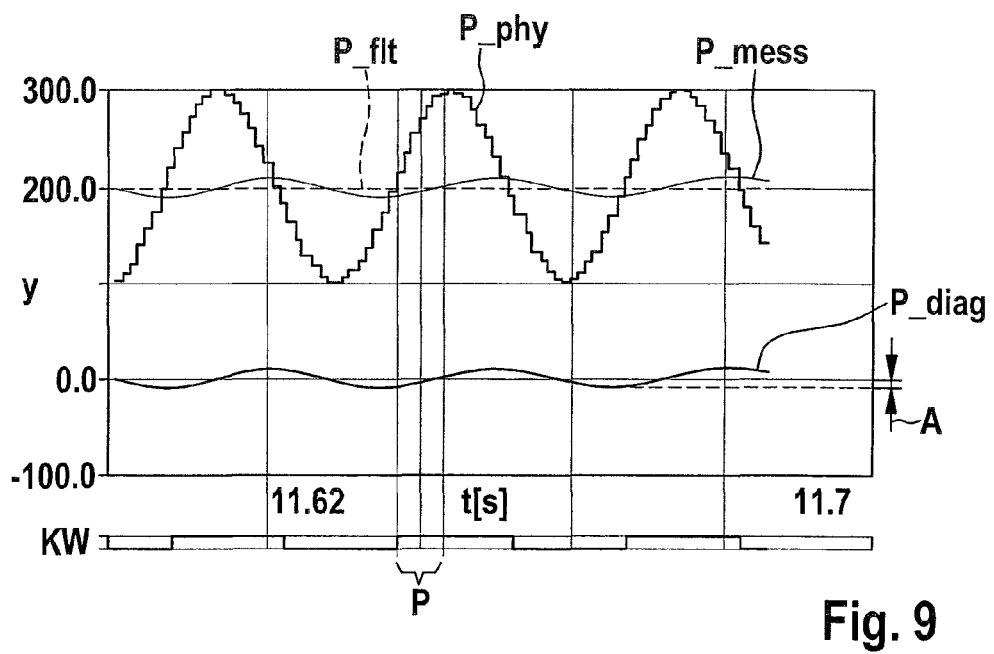
FIG. 9 shows an illustration corresponding to FIG. 7 for a further defective state of the sensor unit.

Lastly, FIG. 9 illustrates an error pattern D4 which results when amplitude A is less than a setpoint value and phase P exceeds a setpoint value. This error pattern corresponds to a slowly responding sensor 18 which responds later, and which due to its lag is not able to follow actual pressure value P_phy quickly enough.

Similarly, error patterns D3 (excessive gain of sensor 18), D5 (too quick a response of sensor 18), D6 (quicker response and less gain of sensor 18), and D7 (slower response and greater gain of sensor 18) may be identified.

The effect of errors of sensor 18 on the features of amplitude A and phase P is clear. However, multiple errors may arise at the same time, so that in this case an unambiguous reversal is not possible based on a single frequency, and the phase information is ambiguous. However, in this case the error patterns may be unambiguously associated by including one or several additional frequencies (harmonics).

The identification of an offset error of sensor 18 is explained below with reference to FIGS. 10 and 11. For identifying such an error, setpoint values may be ascertained as a function of an operating point of internal combustion engine 10. For example, a setpoint value for an amplitude A may be ascertained as a function of at least one operating parameter, for example, an operating parameter 28. Operating parameter 28 concerns in particular the rotational speed of internal combustion engine 10. A further operating parameter 30 may be formed, for example, by the injected quantity per piston stroke in internal combustion engine 10.

Figure 10:
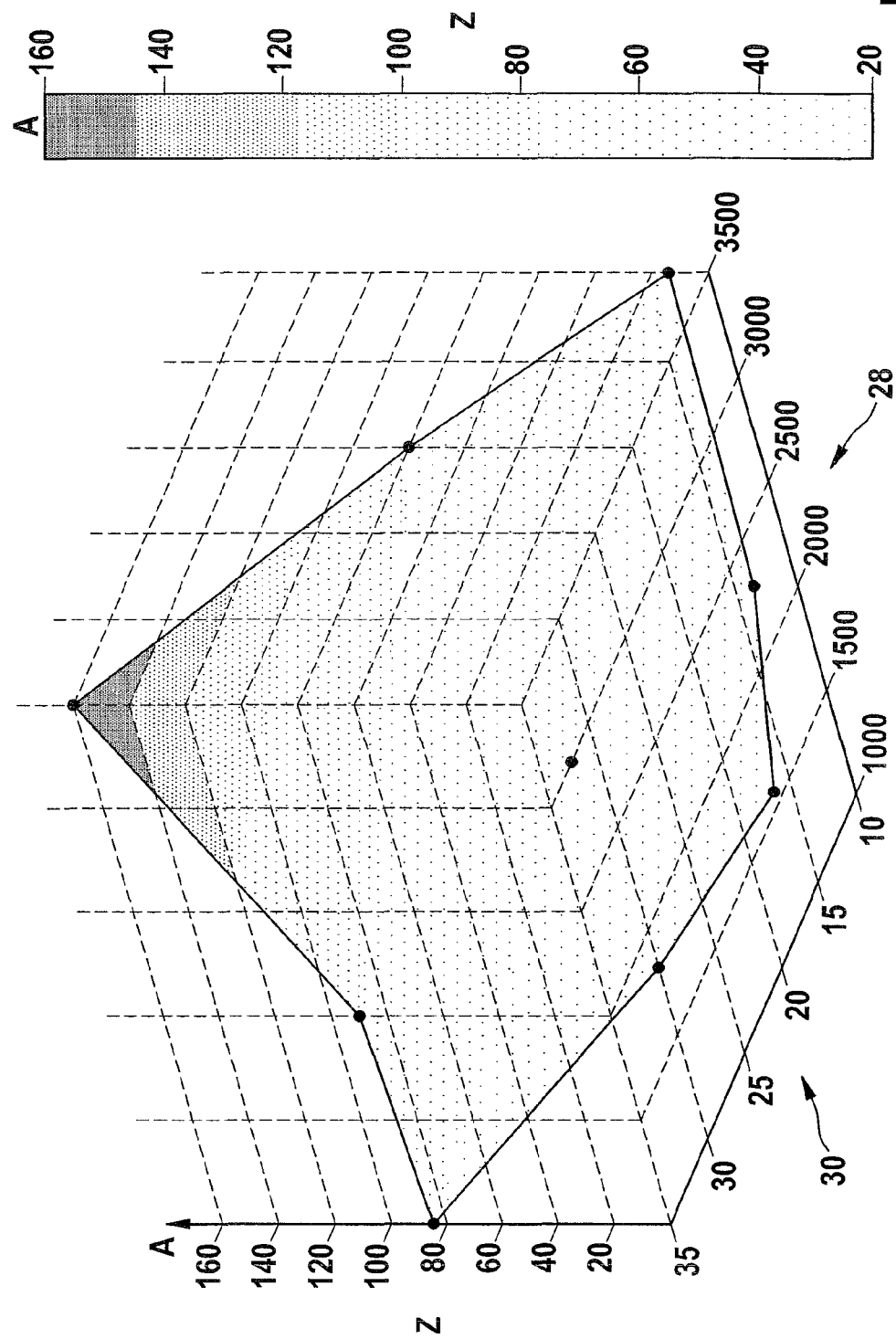
FIG. 10 shows a characteristics map for ascertaining a setpoint value which relates to a periodic characteristic.
Figure 11:
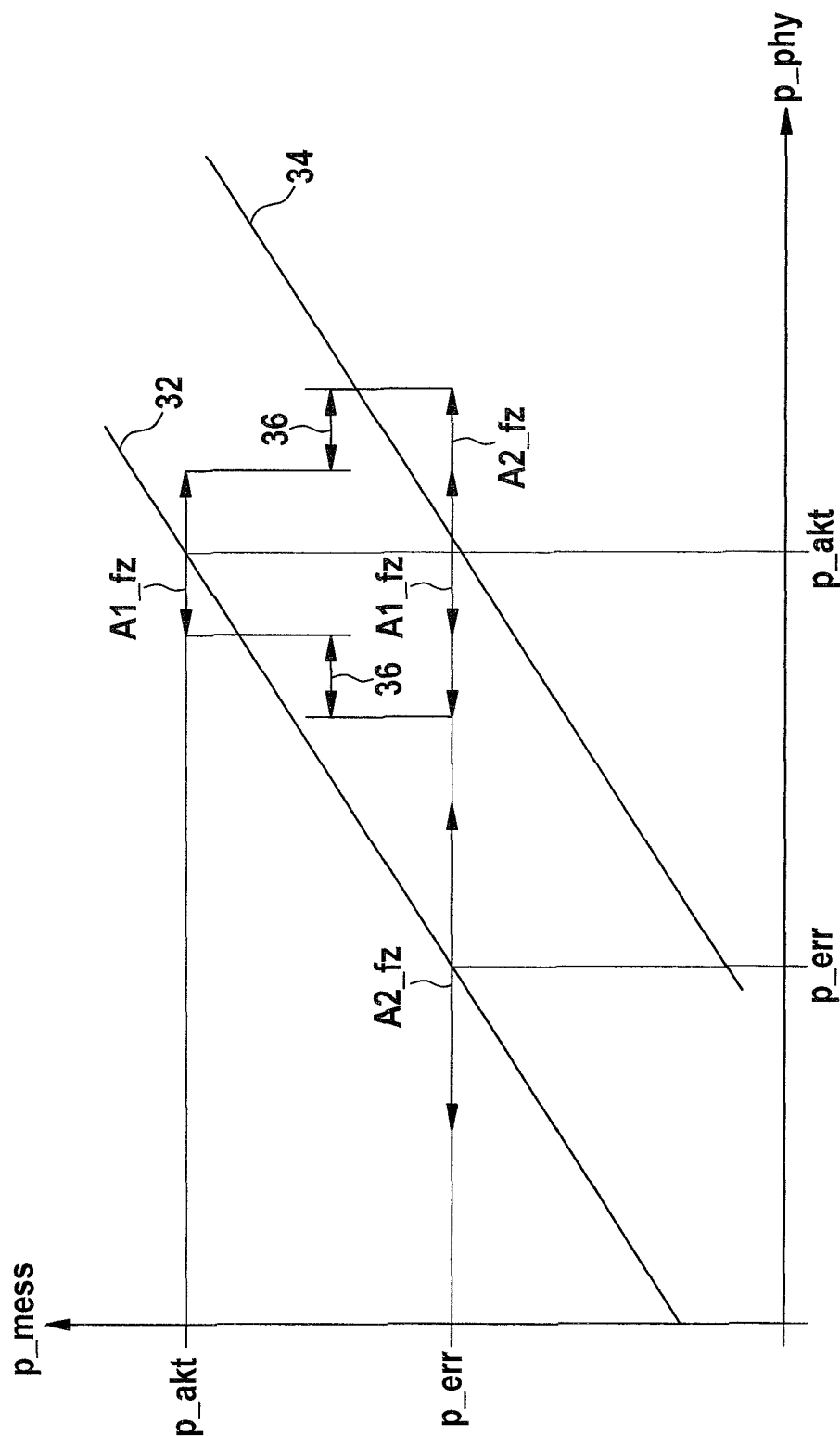
FIG. 11 shows a diagram for illustrating an error pattern resulting for a sensor unit having an offset error.

The setpoint values for amplitude A plotted along the z axis in FIG. 10 correspond to the amplitude of pressure oscillation P_phy.

Furthermore, an additional setpoint value of a feature (amplitude A, for example) is specified as a function of value variation over time 22 of sensor 18. Alternatively, the expected amplitude of the boost pressure may be expressed as a function of the rotational speed, throttle valve position, and the mean value of the boost pressure.

For example, internal combustion engine 10 is at an operating point at which an average pressure p_akt and a first setpoint value A_fz are present. A characteristic curve of a fully operational sensor 18 is indicated by reference numeral 32 in FIG. 11. The characteristic curve of a sensor 18 having offset error is denoted by reference numeral 34.

The offset error of sensor 18 may be identified as follows. The first setpoint value described with reference to FIG. 10 provides physical value P_phy, which is plotted on the horizontal axis in FIG. 11. This value P_phy, until a delay resulting from the transmission performance of sensor 18, corresponds to measured value P_mess for the example of a sensor 18 having no gradient error or dynamic error.

An additional setpoint value A2_fz ascertained as described above results for a pressure p_err which is measured using a defective sensor 18, since average pressure p_err, upon which the ascertainment of second setpoint value A2_fz is based, differs from physical pressure p_akt. Based on the difference between the two setpoint values A1_fz and A2_fz, a conclusion may be drawn regarding an offset error, which is denoted by reference numeral 36 in FIG. 11.

As an alternative or in addition to the analysis options described above, the following periodic characteristics of the variation over time of the value of an output signal of a sensor unit 16 or of a variable derived therefrom may be evaluated: For example, the diagnosis may also be carried out based on a different frequency (harmonic of the ignition frequency). Multiple frequencies may also be used, for example, the ignition frequency and a first harmonic, thus allowing an unambiguous diagnosis to be defined for the underlying errors (sensor time constant, sensor gain).

With regard to the error patterns to be found, the setpoint values stored in control unit 20 may be selected in the form of expected values and/or limit values, depending on the desired rigorousness of the monitoring. If a sensor is to be monitored solely for the error pattern "sensor is frozen," a single lower threshold value for amplitude A is sufficient. If monitoring of gain and time response of a sensor is desired, it may be necessary to store the upper and lower threshold values, possibly as a function of the operating point. For the monitoring for offset error it is advantageous to make use of the dependency of the oscillations on the operating point of the internal combustion engine, and to ascertain the setpoint values redundantly, i.e., in a number of ways.

With regard to the signal processing, which was explained above for the exemplary embodiment according to FIG. 3, there are also other methods for signal conditioning, for example, signal processing in the time range. The signal components of interest (ignition frequency, harmonics) of unconditioned signal P_mess may also be separated using bandpass filters (center frequency in engine orders). For an analysis in the time range, separation of the frequencies of interest is followed by feature formation (ascertainment of amplitude, phase). For this reason it is advantageous to carry out an analysis in the frequency range, since in this range the features amplitude and phase are present as the direct result of the transformation in the pattern range. Since only a few frequencies are of interest for this diagnosis, a discrete Fourier transformation may advantageously be used.

The diagnostic result, i.e., the identification of an error pattern, may be used, depending on the design of the algorithm and the rigorousness of the diagnosis, for example, for a service facility diagnosis for identifying defective components, for onboard diagnostics with inputs in the error memory (control unit 20, for example) and by initiating suitable operational responses, as well as for an adaptation of the operative function, for example, by taking into account a changed sensor time constant in an observer structure.

The method according to the present invention allows the increasingly stringent requirements for onboard diagnostics to be met. In particular, so-called "pinpointing" which allows specific identification of the defective component may be carried out without a redundant sensor system.

What is claimed is:

1. A method for diagnosing a sensor unit of an internal combustion engine, the method comprising:
   comparing an output signal of the sensor unit to a setpoint value which is specified independently from the output signal, wherein the setpoint value possesses a periodic characteristic; and
   analyzing a variation over time of one of (i) a value of the output signal of the sensor unit, and (ii) a variable which is derived from a value variation of the value of the output signal over time with regard to the periodic characteristic;
   detecting a defect in a sensor unit when the analysis results in a measured value that is outside of a predetermined value range;
   wherein the periodic characteristic includes at least one of an amplitude and a phase characteristic, and wherein the comparing includes comparing at least one of the amplitude and the phase characteristic of one of the value variation over time and the variable which is derived from the value variation over time to at least one stored value for the setpoint value, wherein the defect in the sensor unit is assigned to an error pattern depending on the result of the comparison of at least one of the amplitude and the phase characteristic of one of the value variation over time and the variable which is derived from the value variation over time with the at least one stored value for the setpoint value.

2. The method of claim 1, wherein the periodic characteristic is based on at least one reference frequency which is a function of an operating state of the internal combustion engine.

3. The method of claim 2, wherein the reference frequency corresponds to an ignition frequency at which ignition processes of the internal combustion engine are at least one of initiated and carried out.

4. The method of claim 2, wherein the reference frequency corresponds to a revolution frequency of one of a crankshaft and a camshaft of the internal combustion engine.

5. The method of claim 1, wherein the reference frequency is set in relation to a reference position of one of a crankshaft and a camshaft of the internal combustion engine.

6. The method of claim 1, wherein the setpoint value corresponds to an expected value or a limit value.

7. The method of claim 1, wherein the setpoint value is specified as a function of an operating state of the internal combustion engine.

8. The method of claim 1, wherein the sensor unit includes at least one of (i) at least one pressure sensor, and (ii) a mass flow sensor.

9. The method of claim 1, wherein the sensor unit includes at least one evaluation unit for at least one of evaluating and plausibility checking a sensor signal.

10. The method of claim 1, wherein the error pattern of a sensor unit with low gain is assigned to a defect in the sensor unit if the amplitude characteristic of one of the value variation over time and the variable which is derived from the value variation over time is less than a corresponding setpoint value, and the phase characteristic of one of the value variation over time and the variable which is derived from the value variation over time equals the corresponding setpoint value.

11. The method of claim 1, wherein the periodic characteristic is based on at least one reference frequency which is a function of an operating state of the internal combustion engine, wherein the reference frequency corresponds to an ignition frequency at which ignition processes of the internal combustion engine are at least one of initiated and carried out, and wherein the reference frequency is set in relation to a reference position of one of a crankshaft and a camshaft of the internal combustion engine.

12. The method of claim 1, wherein the periodic characteristic is based on at least one reference frequency which is a function of an operating state of the internal combustion engine, wherein the reference frequency corresponds to a revolution frequency of one of a crankshaft and a camshaft of the internal combustion engine, and wherein the reference frequency is set in relation to a reference position of one of a crankshaft and a camshaft of the internal combustion engine.

13. The method of claim 1, wherein a reference frequency is set in relation to a reference position of one of a crankshaft and a camshaft of the internal combustion engine, and wherein the setpoint value is specified as a function of an operating state of the internal combustion engine.

14. The method of claim 1, wherein a reference frequency is set in relation to a reference position of one of a crankshaft and a camshaft of the internal combustion engine, and wherein the setpoint value corresponds to an expected value or a limit value.

15. The method of claim 14, wherein the sensor unit includes at least one of (i) at least one pressure sensor, and (ii) a mass flow sensor, and wherein the sensor unit includes at least one evaluation unit for at least one of evaluating and plausibility checking a sensor signal.

16. A computer readable medium having a computer program, which is executable by a processor, comprising:
- a program code arrangement having program code for diagnosing a sensor unit of an internal combustion engine, by performing the following:
  - comparing an output signal of the sensor unit to a setpoint value which is specified independently from the output signal, wherein the setpoint value possesses a periodic characteristic; and
  - analyzing a variation over time of one of (i) a value of the output signal of the sensor unit, and (ii) a variable which is derived from a value variation of the value of the output signal over time with regard to the periodic characteristic;
  - detecting a defect in a sensor unit when the analysis results in a measured value that is outside of a predetermined value range;
  - wherein the periodic characteristic includes at least one of an amplitude and a phase characteristic, and wherein the comparing includes comparing at least one of the amplitude and the phase characteristic of one of the value variation over time and the variable which is derived from the value variation over time to at least one stored value for the setpoint value, wherein the defect in the sensor unit is assigned to an error pattern depending on the result of the comparison of at least one of the amplitude and the phase characteristic of one of the value variation over time and the variable which is derived from the value variation over time with the at least one stored value for the setpoint value.

17. A control unit for an internal combustion engine, comprising:
- wherein the control unit is configured for diagnosing a sensor unit of an internal combustion engine, by performing the following:
  - comparing an output signal of the sensor unit to a setpoint value which is specified independently from the output signal, wherein the setpoint value possesses a periodic characteristic; and
  - analyzing a variation over time of one of (i) a value of the output signal of the sensor unit, and (ii) a variable which is derived from a value variation of the value of the output signal over time with regard to the periodic characteristic;
  - detecting a defect in a sensor unit when the analysis results in a measured value that is outside of a predetermined value range;
  - wherein the periodic characteristic includes at least one of an amplitude and a phase characteristic, and wherein the comparing includes comparing at least one of the amplitude and the phase characteristic of one of the value variation over time and the variable which is derived from the value variation over time to at least one stored value for the setpoint value, wherein the defect in the sensor unit is assigned to an error pattern depending on the result of the comparison of at least one of the amplitude and the phase characteristic of one of the value variation over time and the variable which is derived from the value variation over time with the at least one stored value for the setpoint value.

* * * * *